United States Patent
Cha

(10) Patent No.: US 9,308,860 B2
(45) Date of Patent: Apr. 12, 2016

(54) PASSENGER PROTECTION APPARATUS USING GRAPHIC LIGHT PROJECTION AND METHOD THEREOF

(75) Inventor: Dong Eun Cha, Whasung-Si (KR)

(73) Assignee: Hyundai Motor Company, Seoul (KR)

( * ) Notice: Subject to any disclaimer, the term of this patent is extended or adjusted under 35 U.S.C. 154(b) by 583 days.

(21) Appl. No.: 13/450,045

(22) Filed: Apr. 18, 2012

(65) Prior Publication Data

US 2013/0120130 A1 May 16, 2013

(30) Foreign Application Priority Data

Nov. 14, 2011 (KR) ........................ 10-2011-0118337

(51) Int. Cl.
*B60Q 1/26* (2006.01)
*B60Q 1/32* (2006.01)
*B60R 3/02* (2006.01)
*B60R 9/02* (2006.01)
*B60Q 1/24* (2006.01)

(52) U.S. Cl.
CPC . *B60Q 1/323* (2013.01); *B60R 3/02* (2013.01); *B60Q 1/24* (2013.01); *B60Q 1/32* (2013.01); *B60Q 2400/50* (2013.01); *B60R 9/02* (2013.01)

(58) Field of Classification Search
CPC ............ G06F 19/00; B60Q 1/14; B60R 3/002
USPC .................................. 340/460, 692
See application file for complete search history.

(56) References Cited

U.S. PATENT DOCUMENTS

| | | | | |
|---|---|---|---|---|
| 4,964,022 A | * | 10/1990 | Lane | B60Q 1/24 362/227 |
| 4,965,704 A | * | 10/1990 | Osborne, Sr. | B60R 3/002 362/249.01 |
| 5,467,071 A | * | 11/1995 | Koenig | B60Q 1/50 340/433 |
| 5,669,704 A | * | 9/1997 | Pastrick | B60Q 1/2665 362/494 |
| 5,806,869 A | * | 9/1998 | Richards | B60R 3/002 280/163 |

(Continued)

FOREIGN PATENT DOCUMENTS

| | | |
|---|---|---|
| JP | 2000-255317 A | 9/2000 |
| JP | 2011-105163 A | 6/2011 |

(Continued)

*Primary Examiner* — Jennifer Mehmood
*Assistant Examiner* — Rufus Point
(74) *Attorney, Agent, or Firm* — Morgan, Lewis & Bockius LLP

(57) ABSTRACT

An apparatus mounted on a vehicle to protect a passenger using a graphic light projection includes a first detection unit configured to detect an opening of a vehicle door, a second detection unit configured to detect a boarding of a boarding person or an alighting of an alighting person, a side step driving unit configured to drive an intelligent side step, a light projection unit configured to project a boarding protection light or an alighting protection light, and a control unit configured to control the side step driving unit to pull out the intelligent side step set within the vehicle when the first detection unit detects the opening of the vehicle door and configured to control the light projection unit to project the alighting protection light when the second detection unit detects the alighting of the alighting person.

10 Claims, 4 Drawing Sheets

(56) References Cited

U.S. PATENT DOCUMENTS

| | | | | |
|---|---|---|---|---|
| 6,018,295 | A * | 1/2000 | Jewell | B60Q 1/32 340/464 |
| 7,175,320 | B1 * | 2/2007 | Burgess | B60Q 1/0483 340/433 |
| 7,283,034 | B2 * | 10/2007 | Nakamura | B60R 25/246 340/5.2 |
| 7,400,235 | B2 * | 7/2008 | Kawazoe | B60Q 1/24 296/1.11 |
| 7,422,408 | B2 * | 9/2008 | Sobota | A61G 3/06 362/481 |
| 7,731,403 | B2 * | 6/2010 | Lynam | B60K 35/00 257/79 |
| 7,878,693 | B2 * | 2/2011 | Liesener | B60R 1/1207 362/293 |
| 8,033,699 | B2 * | 10/2011 | Pastrick | B60Q 1/2665 362/142 |
| 8,075,169 | B2 * | 12/2011 | Englander | B60Q 1/24 362/478 |
| 8,182,125 | B2 * | 5/2012 | Englander | B60Q 1/24 362/478 |
| 2003/0107900 | A1 * | 6/2003 | Ellison | B60Q 1/32 362/485 |
| 2003/0108412 | A1 * | 6/2003 | Zimmer | A61G 3/02 414/522 |
| 2003/0189837 | A1 * | 10/2003 | Potter | B60R 3/002 362/495 |
| 2004/0100063 | A1 * | 5/2004 | Henderson | B60R 3/02 280/166 |
| 2004/0108678 | A1 * | 6/2004 | Berkebile | B60R 3/02 280/166 |
| 2005/0068785 | A1 * | 3/2005 | Takeda | B60Q 1/323 362/506 |
| 2007/0053195 | A1 * | 3/2007 | Alberti | B60Q 1/2665 362/494 |
| 2007/0200689 | A1 * | 8/2007 | Kawazoe | B60Q 1/24 340/435 |
| 2008/0044268 | A1 * | 2/2008 | Heigl | B60P 1/4471 414/462 |
| 2008/0100023 | A1 * | 5/2008 | Ross | B60R 3/02 280/166 |
| 2009/0066255 | A1 * | 3/2009 | Nakayama | B60Q 1/323 315/77 |
| 2009/0161379 | A1 * | 6/2009 | Liesener | B60R 1/1207 362/494 |
| 2009/0259371 | A1 * | 10/2009 | Heigl | B60P 1/4471 701/49 |
| 2010/0073949 | A1 * | 3/2010 | Sato | B60Q 1/007 362/494 |
| 2010/0302797 | A1 * | 12/2010 | Pastrick | B60Q 1/2665 362/555 |
| 2011/0115375 | A1 * | 5/2011 | Shiratsuchi | B60Q 1/2669 315/77 |
| 2011/0273671 | A1 * | 11/2011 | Chu | G03B 21/14 353/13 |
| 2013/0021147 | A1 * | 1/2013 | Gagnon | B60Q 3/004 340/438 |
| 2013/0051040 | A1 * | 2/2013 | Kracker | B60Q 1/2665 362/464 |
| 2014/0039766 | A1 * | 2/2014 | Miyake | B60R 25/425 701/49 |
| 2014/0191859 | A1 * | 7/2014 | Koelsch | H02J 7/0047 340/455 |
| 2014/0218212 | A1 * | 8/2014 | Nykerk | B60Q 1/0023 340/901 |
| 2014/0218521 | A1 * | 8/2014 | Tanaka | B60Q 1/24 348/148 |
| 2014/0320823 | A1 * | 10/2014 | Ammar | B60R 1/12 353/13 |

FOREIGN PATENT DOCUMENTS

| | | |
|---|---|---|
| KR | 1999-001560 U | 1/1999 |
| KR | 10-2005-0047637 A | 5/2005 |
| KR | 10-0840754 B1 | 6/2008 |
| KR | 10-2010-023397 A | 3/2010 |

* cited by examiner (a) 
(b)

PASSENGER PROTECTION APPARATUS USING GRAPHIC LIGHT PROJECTION AND METHOD THEREOF

CROSS-REFERENCES TO RELATED APPLICATIONS

The present application claims priority to Korean Patent Application No. 10-2011-0118337, filed on Nov. 14, 2011, the entire contents of which is incorporated herein for all purposes by this reference.

BACKGROUND OF THE INVENTION

1. Field of the Invention

The present invention relates to a passenger protection apparatus using a graphic light projection and a method therefor, and more particularly, to a passenger protection apparatus using a graphic light projection and a method therefor, in which passengers may be protected from a car or motorcycle running from a rear by projecting a boarding protection light onto a street on a side of a person who is to board a vehicle (hereinafter, "boarding person") when the boarding person is detected and the alighting protection light is projected onto a street on a side of a person who is to alight from the vehicle (hereinafter, "a lighting person") when the alighting person is detected.

Hereinafter, the term "passenger" is used to refer to the boarding person and the alighting person including a driver and a passenger.

2. Description of Related Art

Generally, a driver of a vehicle is responsible for ensuring that a passenger safely alights from the vehicle. However, the driver cannot inform neighboring vehicles or motorcycles about the passenger's alighting behavior, and thus, traffic accidents frequently occur in which the alighting passenger crashes with, for example, the motorcycle.

To solve this problem, a technique for installing a lamp in the vehicle to notify an opening of a vehicle door has been suggested; however, such technique has an insignificant effect because the lamp cannot draw sufficient attention from a driver of a vehicle or motorcycle.

Recently, increased attention has been given to a graphic light projection, which emphasizes distinct characteristics of buildings, bridges, monuments and trees through lighting to create a city's unique identity and form a landmark.

Such graphic light projection is used to recreate a city's night view to provide an aesthetic landscape, to brighten the city's facilities and objects to secure safety and public order of citizens, as well as to clarify the city's form and function, and to add an artistic value to the city's historical/cultural value, thereby raising dignity of the city.

There is a need for a solution to maximize safety of the passenger by combining the graphic light projection having the above features with a passenger protection technology of a vehicle.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a passenger protection apparatus using a graphic light projection and a method therefor, in which passengers may be protected from a car or motorcycle running from a rear by projecting a boarding protection light onto a street on a side of a person who is to board a vehicle (hereinafter, "boarding person") when the boarding person is detected and the alighting protection light is projected onto a street on a side of a person who is to alight from the vehicle (hereinafter, "a lighting person") when the alighting person is detected.

In the present invention, the term "passenger" is used to refer to the boarding person and the alighting person including a driver and a passenger.

According to an aspect of the present invention, an apparatus mounted on a vehicle to protect a passenger using a graphic light projection, may include a first detection unit detecting an opening of a vehicle door, a second detection unit detecting a boarding of a boarding person or an alighting of an alighting person, a side step driving unit driving a side step, a light projection unit projecting a boarding protection light or an alighting protection light, and a control unit controlling the side step driving unit to pull out the side step set within the vehicle when the first detection unit detects the opening of the vehicle door, and controlling the light projection unit to project the alighting protection light when the second detection unit detects the alighting of the alighting person.

The control unit controlling the light projection unit to stop projecting the alighting protection light when the vehicle is operated in a driving mode.

The apparatus may further include a third detection unit detecting the boarding person located within a predetermined distance from the vehicle, wherein the control unit controls the light projection unit to project the boarding protection light when the third detection unit detects the boarding person and controls the side step driving unit to pull out the side step set within the vehicle when the first detection unit detects the opening of the vehicle door.

The third detection unit may include a smart key detection sensor.

The control unit controls the light projection unit to stop projecting the boarding protection light when the vehicle is operated in a driving mode.

The apparatus may further include an alarm unit, wherein the control unit controls the alarm unit to send an alarm when the first detection unit detects the opening of the vehicle door.

The second detection unit detects a pressure generated when the boarding person or the alighting person steps thereon.

In another aspect of the present invention, a passenger protection method using a graphic light projection, may include detecting, by a first detection unit, an opening of a vehicle door, pulling out, by a side step driving unit, a side step set within a vehicle in response to the opening of the vehicle door, detecting, by a second detection unit positioned in the side step, alighting of an alighting person, and projecting, by a light projection unit, an alighting protection light upon detecting the alighting of the alighting person.

The passenger protection method may further include stopping projecting the alighting protection light when the vehicle is operated in a driving mode.

The passenger protection method may further include sending an alarm in response to the opening of the vehicle door.

The detecting of the alighting of the alighting person may include detecting a pressure generated by stepping of the alighting person.

In further another aspect of the present invention, a passenger protection method using a graphic light projection may include detecting, by a third detection unit, a boarding person located within a predetermined distance from a vehicle, projecting, by a light projection unit, a boarding protection light upon detecting the boarding person, detecting, by a first detection unit, an opening of a vehicle door, and pulling out, by a side step driving unit, a side step set within the vehicle in response to the opening of the vehicle door.

The passenger protection method may further include stopping projecting the boarding protection light when the vehicle is operated in a driving mode.

The third detection unit may include a smart key detection sensor.

The passenger protection method may further include sending an alarm in response to the opening of the vehicle door.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
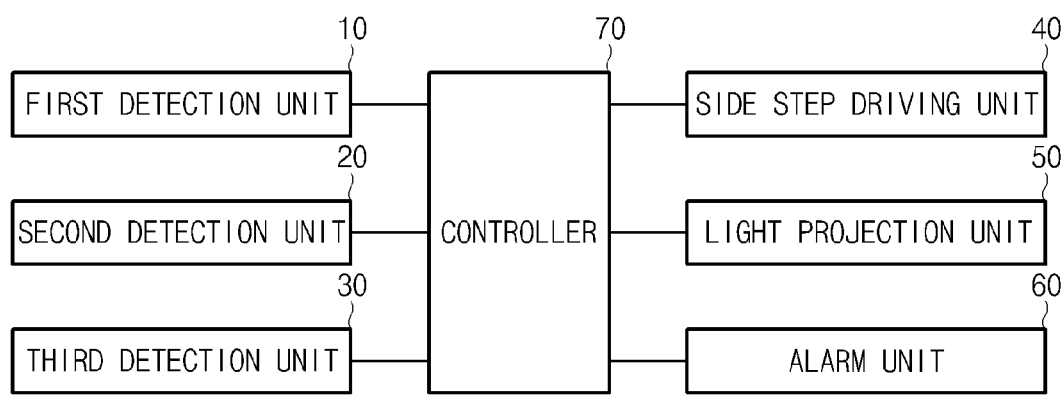
FIG. 1 is a configuration view illustrating an exemplary embodiment of a passenger protection apparatus using a graphic light projection according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION OF EXEMPLARY EMBODIMENTS

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Hereinafter, exemplary embodiments of the present invention will be described in detail with reference to the accompanying drawings.

FIG. 1 is a configuration view illustrating an exemplary embodiment of a passenger protection apparatus using a graphic light projection according to an exemplary embodiment of the present invention.

As shown in FIG. 1, a passenger protection apparatus using a graphic light projection according to an exemplary embodiment of the present invention includes a first detection unit 10, a second detection unit 20, a third detection unit 30, a side step driving unit 40, a light projection unit 50, an alarm unit 60, and a controller 70.

Each element will be described in detail. First, the first detection unit 10 is a sensor that is mounted on one side of a vehicle door and detects whether the vehicle door is opened or closed by a boarding person or an alighting person.

For example, the first detection unit 10 may detect whether the vehicle door is opened or closed depending on a locking state of a vehicle door locking device. Here, the locking device may allow the vehicle door to open by, for example, pulling a lock lever or pressing a button. The first detection unit 10 detects whether the door is opened or closed regardless of a door opening method of the locking device.

Next, the second detection unit 20 is a pressure sensor that is mounted on a side step 40 and detects a pressure generated when being stepped on by the passenger who is boarding or alighting. In another example, an infrared sensor or radar that detects an object in a predetermined area of the side step 40 by using a light can be used for the second detection unit 20.

Next, the third detection unit 30 is a sensor for detecting the passenger through a wireless communication and, for example, includes a smart key detection sensor. The third detection unit 30 detects a smart key located within a predetermined distance range, e.g., 3 m to 7 m. Here, the smart key has unique identification information so that the third detection unit 30 may identify a smart key corresponding to its own vehicle instead of other vehicle.

Usually, the smart key is owned only by a driver, and thus is limited in number so that detecting passengers may have a limitation. Therefore, by providing at least one or more radio frequency identification device, the third detection unit 30 may detect the radio frequency identification device.

Next, the side step driving unit 40 is used to drive an intelligent side step, which is located inside the vehicle and pulled toward an outside when needed. Here, the side step indicates a stepping stool that is stepped on by the boarding person when climbing on to the vehicle or by the alighting person when leaving the vehicle.

In other words, the side step driving unit 40 is a module which pulls out the side step located within the vehicle or places the side step that is pulled out into an inside of the vehicle. The side step driving unit 40 pulls the side step out according to the control of the controller 70 when the vehicle door is opened, and when the vehicle door is closed, the side step driving unit 40 places the side step inside the vehicle according to the control of the controller 70.

The intelligent side step described above may include various types such as, for example, a link type or a rotation type, however, the type of the intelligent side step does not affect the subject matter of the present invention.

Figure 2:
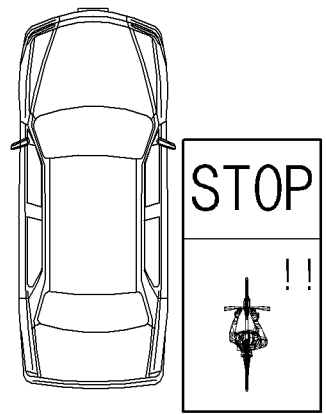
FIG. 2 is a view illustrating an example of a boarding protection light and an alighting protection light according to an exemplary embodiment of the present invention.
Figure 2:
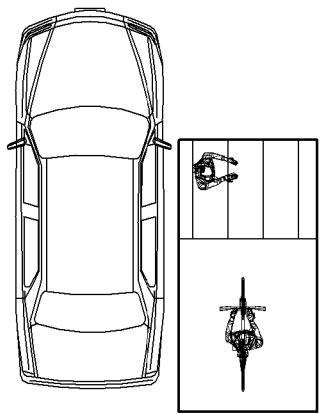

Next, the light projection unit 50 is a module that is mounted to one side of the vehicle to project a boarding protection light and an alighting protection light. For example, as shown in FIG. 2, the light projection unit 50 projects the alighting protection light (a) and the boarding protection light (b), as shown in FIG. 2, according to the control of the controller 70.

The light projection unit 50 may be mounted to one side of the side step that is pulled out or in according to the control of the controller 70 so that the alighting protection light may be prevented from being partially blocked by the alighting person.

The alarm unit 60, which is an additional element, sends a visual or audible alarm according to the control of the controller 70 when the first detection unit 10 detects a locking release of the locking device, i.e., when the vehicle door is opened.

The function of the controller 70 may be implemented by using an electronic control unit (ECU) equipped in the vehicle or a separate control unit associated with the ECU.

The controller 70 controls the side step driving unit 40 to pulls out the side step that is set inside the vehicle upon detection by the first detection unit 10 that the vehicle door is opened, and controls the light projection unit 50 to project the alighting protection light upon detection by the second detection unit 20 that the alighting person alights from the vehicle.

Next, as the vehicle is operated in the driving mode, the controller 70 controls the light projection unit 50 to stop projecting the alighting protection light.

In addition, the controller 70 controls the light projection unit 50 to project the boarding protection light upon detection, by the third detection unit 30, that the boarding person approaches thereto, and controls the side step driving unit 40 to pull out the side step set within the vehicle upon detection, by the first detection unit 10, that the vehicle door is opened.

Next, as the vehicle is operated in the driving mode, the controller 70 controls the light projection unit 50 to stop projecting the boarding protection light.

Figure 3:
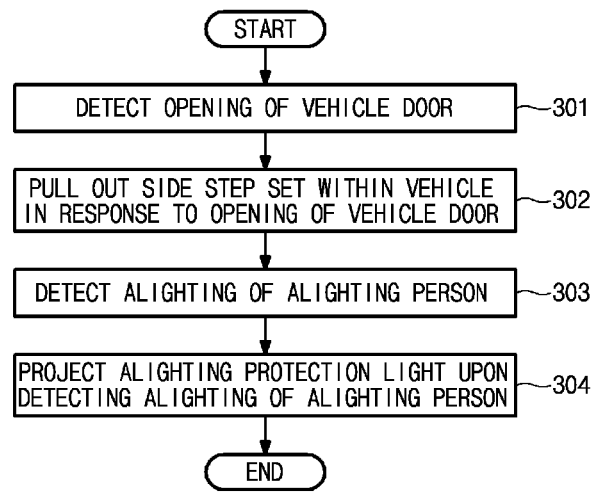
FIG. 3 is a flowchart diagram illustrating an exemplary embodiment of an alighting person protection method in a passenger protection apparatus using a graphic light projection according to an exemplary embodiment of the present invention.

FIG. 3 is a flowchart diagram illustrating an exemplary embodiment of an alighting person protection method in a passenger protection apparatus using a graphic light projection according to an exemplary embodiment of the present invention.

First, when the locking state of the locking device is released so that the alighting person alights from the vehicle, namely, when the vehicle door is opened, the first detection unit 10 detects such event (301).

Next, the controller 70 controls the side step driving unit 40 to pull out the side step set within the vehicle (302). In other words, the side step driving unit 40 pulls out the side step based on the control of the controller 70. Here, the controller 70 may control the alarm unit 60 to send an alarm.

Next, the second detection unit 20 detects alighting of the alighting person (303). In other words, the second detection unit 20 detects, for example, a pressure generated when the driver steps on the side step.

Then, the controller 70 controls the light projection unit 50 to project the alighting protection light. In other words, the light projection unit 50 projects the alighting protection light according to the control of the controller 70 (304).

Next, when the vehicle is operated in the driving mode, the controller 70 controls the light projection unit 50 to stop projecting the alighting protection light.

In this manner, by projecting the alighting protection light onto a street surface, a driver in a car or motorbike that approaches from a rear may recognize the alighting person and drive safely, thereby preventing a car accident.

Figure 4:
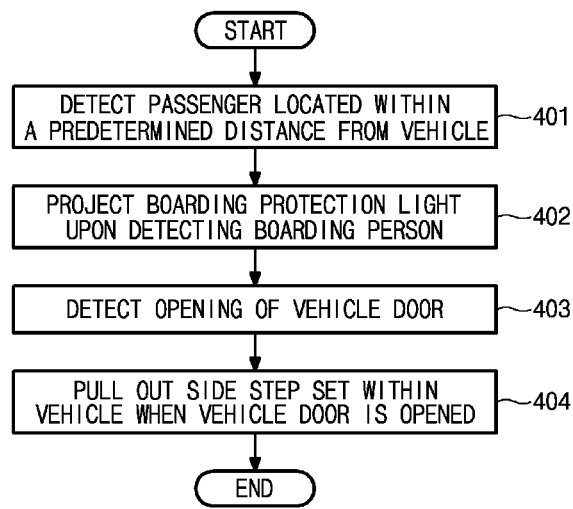
FIG. 4 is a flowchart diagram illustrating an exemplary embodiment of a boarding person protection method in a passenger protection apparatus using a graphic light projection according to an exemplary embodiment of the present invention.

FIG. 4 is a flowchart diagram illustrating an exemplary embodiment of a boarding person protection method in a passenger protection apparatus using a graphic light projection according to an exemplary embodiment of the present invention.

First, the third detection unit 30 detects a passenger located within a predetermined distance range from the vehicle (401). In other words, an identification device possessed by the passenger located within the predetermined distance range from the vehicle is identified.

Then, the controller 70 determines that the passenger boards the vehicle and controls the light projection unit 50 to project the boarding protection light (402). In other words, the light projection unit 50 projects the boarding protection light according to the control of the controller 70.

Next, when the boarding person releases the locking state of the locking device to board the vehicle, namely, when the vehicle door is opened, the first detection unit 10 detects such event (403).

Then, the controller 70 controls the side step driving unit 40 to pull out the side step set within the vehicle (404). In other words, the side step driving unit 40 draws the side step according to the control of the controller 70. Here, the controller 70 may control the alarm unit 60 to send the alarm.

In this manner, by projecting the boarding protection light onto the street surface, the driver in the car or motorbike that approaches from the rear may recognize the boarding person and drive safely, thereby preventing a car accident.

Next, when the vehicle is operated in the driving mode, the controller 70 controls the light projection unit 50 to stop projecting the boarding protection light. Here, the controller 70 may control the light projection unit 50 to stop projecting the boarding protection light when the vehicle door is closed.

According to an exemplary embodiment of the present invention described above, when a person who is to board the vehicle (i.e., boarding person) is detected, the boarding protection light is projected on a street on the boarding person's side, and when a person who is to alight from the vehicle is detected, the alighting protection light is projected on the street on the alighting person's side. Accordingly, passengers may be protected from a car or motorcycle running from the rear.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. An apparatus mounted on a vehicle to protect a passenger using a graphic light projection, the apparatus comprising:
 a first detection unit detecting an opening of a vehicle door;
 a second detection unit detecting a boarding of a boarding person or an alighting of an alighting person;
 a side step driving unit driving a side step;
 a light projection unit mounted to a side of the side step and projecting a boarding protection graphic light or an alighting protection graphic light;
 a third detection unit detecting the boarding person located within a predetermined distance from the vehicle; and a control unit controlling the side step driving unit to pull out the side step set within the vehicle when the first detection unit detects the opening of the vehicle door, and controlling the light projection unit to project the alighting protection graphic light when the second detection unit detects the alighting of the alighting person, wherein the control unit controls the light projection unit to project the boarding protection graphic light when the third detection unit detects the boarding person and then the side step driving unit to pull out the side step set within the vehicle, when the boarding person detected by the third detection unit is determined to be within the predetermined distance from the vehicle and the first detection unit detects the opening of the vehicle door.

2. The apparatus according to claim 1, wherein the control unit controlling the light projection unit to stop projecting the alighting protection graphic light when the vehicle is operated in a driving mode.

3. The apparatus according to claim 1, wherein the third detection unit includes a smart key detection sensor.

4. The apparatus according to claim 1, wherein the control unit controls the light projection unit to stop projecting the boarding protection graphic light when the vehicle is operated in a driving mode.

5. The apparatus according to claim 1, further comprising:
an alarm unit,
wherein the control unit controls the alarm unit to send an alarm when the first detection unit detects the opening of the vehicle door.

6. The apparatus according to claim 1, wherein the second detection unit detects a pressure generated when the boarding person or the alighting person steps thereon.

7. A passenger protection method using a graphic light projection, the method comprising:
detecting, by a third detection unit, a boarding person located within a predetermined distance from a vehicle;
detecting, by a second detection unit, a boarding of the boarding person;
projecting, by a light projection unit, a boarding protection graphic light upon detecting the boarding person;
detecting, by a first detection unit, an opening of a vehicle door; and
pulling out, by a side step driving unit, a side step set within the vehicle, in response to the opening of the vehicle door when the boarding person detected by the third detection unit is determined to be within the predetermined distance from the vehicle, wherein the light projection unit is mounted to a side of the side step.

8. The passenger protection method according to claim 7, further including:
stopping projecting the boarding protection graphic light when the vehicle is operated in a driving mode.

9. The apparatus according to claim 7, wherein the third detection unit includes a smart key detection sensor.

10. The passenger protection method according to claim 7, further including:
sending an alarm in response to the opening of the vehicle door.

\* \* \* \* \*